(12) United States Patent
Kleyer et al.

(10) Patent No.: US 6,433,055 B1
(45) Date of Patent: Aug. 13, 2002

(54) ELECTRICALLY CONDUCTIVE HOT-MELT SILICONE ADHESIVE COMPOSITION

(75) Inventors: Don Lee Kleyer, Hemlock; Michael Andrew Lutz, Hope, both of MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/661,416

(22) Filed: Sep. 13, 2000

(51) Int. Cl.$^7$ .................................................. C08K 5/05
(52) U.S. Cl. ........................ 524/379; 156/329; 252/514; 252/519.31; 524/398; 524/588
(58) Field of Search ............................ 252/514, 519.31; 524/588, 398, 379; 156/329

(56) References Cited

U.S. PATENT DOCUMENTS

| | | | |
|---|---|---|---|
| 3,888,815 A | 6/1975 | Bessmer et al. | 260/37 SB |
| 4,820,446 A | 4/1989 | Prud'Homme | 252/511 |
| 4,822,523 A | 4/1989 | Prud'Homme | 252/511 |
| 4,865,920 A | 9/1989 | Sweet | 428/447 |
| 5,147,916 A | 9/1992 | Sweet | 524/266 |
| 5,162,410 A | 11/1992 | Sweet | 524/266 |
| 5,246,997 A | 9/1993 | Sweet | 524/266 |
| 5,290,564 A | 3/1994 | Sweet | 424/448 |
| 5,300,299 A | 4/1994 | Sweet et al. | 424/448 |
| 5,302,671 A | 4/1994 | Cifuentes et al. | 525/477 |
| 5,328,696 A | 7/1994 | Noel | 424/449 |
| 5,340,887 A | 8/1994 | Vincent et al. | 525/477 |
| 5,352,722 A | 10/1994 | Sweet et al. | 524/266 |
| 5,371,128 A | 12/1994 | Ulman et al. | 524/265 |
| 5,473,026 A | 12/1995 | Steong et al. | 525/477 |
| 5,482,988 A | 1/1996 | Ulman et al. | 524/266 |
| 5,508,360 A | 4/1996 | Cifuentes et al. | 525/477 |
| 5,578,319 A | 11/1996 | Noel | 424/448 |
| 5,658,975 A | 8/1997 | Ulman et al. | 524/266 |
| 5,905,123 A | 5/1999 | Cifuentes et al. | 525/477 |
| 6,010,646 A | * 1/2000 | Schleifstein | |

FOREIGN PATENT DOCUMENTS

| | | |
|---|---|---|
| JP | 03-128968 | 5/1991 |
| JP | 03-128968 A3 * | 5/1991 |

* cited by examiner

Primary Examiner—Robert Dawson
Assistant Examiner—Marc S. Zimmer
(74) Attorney, Agent, or Firm—Larry A. Milco; Catherine U. Brown

(57) ABSTRACT

An electrically conductive hot-melt silicone adhesive composition, comprising (A) a hot-melt silicone adhesive; (B) an electrically conductive filler in an amount sufficient to impart electrical conductivity to the composition, wherein the filler comprises particles having at least an outer surface of a metal selected from silver, gold, platinum, palladium, and alloys thereof; and (C) an effective amount of a hydroxy-functional organic compound having a molecular weight up to about 1000 and containing at least one hydroxy group per molecule, provided that when the composition is curable, the compound does not substantially inhibit cure.

22 Claims, No Drawings

ELECTRICALLY CONDUCTIVE HOT-MELT SILICONE ADHESIVE COMPOSITION

FIELD OF THE INVENTION

The present invention relates to a hot-melt silicone adhesive composition and more particularly to a hot-melt silicone adhesive composition containing an electrically conductive filler and a hydroxy-functional organic compound.

BACKGROUND OF THE INVENTION

Hot-melt silicone adhesives are useful in a variety of applications because they possess the processing advantages of hot-melt adhesives in combination with the performance advantages of silicones, such as thermal stability, good moisture resistance, excellent flexibility, high ionic purity, low alpha particle emissions, and good adhesion to various substrates. For example, hot-melt silicone adhesives are potentially useful in the medical, automotive, electronic, construction, appliance, and aerospace industries.

Hot-melt silicone pressure sensitive adhesive (PSA) compositions are known in the art. For example, hot-melt silicone PSA compositions comprising a silicone fluid and a silicone resin are disclosed in U.S. Pat. Nos. 5,371,128; 4,865,920; 5,328,696; 5,658,975; 5,578,319; 5,147,916; 5,246,997; 5,290,564; 5,162,410; 5,482,988; 5,352,722; and 5,300,299. Moreover, moisture-curable hot-melt silicone PSA compositions are disclosed in U.S. Pat. Nos. 5,508,360; 5,340,887; 5,473,026; 5,302,671; and 5,905,123. However, the preceding references do not teach the electrically conductive filler and the hydroxy-functional organic compound of the present invention.

Hot-melt adhesive compositions comprising a thermoplastic silicone block copolymer and an electrically conductive filler are also known in the art. For example, U.S. Pat. No. 4,820,446 to Prud'Home discloses an electrically conductive, potentially adhesive composition comprising a thermoplasitc block copolymer containing polysiloxane and urethane groups having elastomeric properties, and particles whose surface at least is electrically conductive. Furthermore, U.S. Pat. No. 4,822,523 to Prud'Home discloses an electrically conductive, potentially adhesive composition comprising a thermoplastic polyblock organopolysiloxane copolymer having elastomeric properties, and particles whose surface at least is electrically conductive. However, neither of the aforementioned patents teaches the hydroxy-functional organic compound of the present invention.

SUMMARY OF THE INVENTION

The present invention is directed to an electrically conductive hot-melt silicone adhesive composition, comprising:

(A) a hot-melt silicone adhesive;
(B) an electrically conductive filler in an amount sufficient to impart electrical conductivity to the composition, wherein the filler comprises particles having at least an outer surface of a metal selected from silver, gold, platinum, palladium, and alloys thereof; and
(C) an effective amount of a hydroxy-functional organic compound having a molecular weight up to about 1000 and containing at least one hydroxy group per molecule, provided that when the composition is curable, the compound does not substantially inhibit cure.

The silicone composition of this invention has numerous advantages, including good flow, low VOC (volatile organic compound) content, good adhesion, and unexpectedly superior electrical conductivity as evidenced by low contact resistance and/or volume resistivity.

The silicone composition of this invention has numerous uses, including die attach adhesives, solder replacements, and electrically conductive coatings and gaskets. In particular, the silicone composition is useful for bonding electronic components to flexible or rigid substrates. The composition of the present invention is also useful as a thermal interface material in semiconductor packages. For example, the silicone composition can be used as the thermal interface between heat-generating semiconductor elements, such as power transistors and integrated circuits, and substrates, lead frames, and heat-dissipating fins.

These and other features, aspects, and advantages of the present invention will become better understood with reference to the following description and appended claims.

DETAILED DESCRIPTION OF THE INVENTION

This invention pertains to an electrically conductive hot-melt silicone adhesive composition, comprising:

(A) a hot-melt silicone adhesive;
(B) an electrically conductive filler in an amount sufficient to impart electrical conductivity to the composition, wherein the filler comprises particles having at least an outer surface of a metal selected from silver, gold, platinum, palladium, and alloys thereof; and
(C) an effective amount of a hydroxy-functional organic compound having a molecular weight up to about 1000 and containing at least one hydroxy group per molecule, provided that when the organosilicon composition is curable, the compound does not substantially inhibit cure.

Component (A) of this invention is at least one hot-melt silicone adhesive. As used herein, the term "hot-melt" describes a silicone adhesive that is nonflowable at room temperature, but converts to a flowable state at an elevated temperature, for example, from about 50 to about 200° C. Component (A) can be any hot-melt silicone adhesive known in the art, provided the silicone composition formed by combining component (A) with components (B) and (C) exhibits improved contact resistance and/or volume resistivity compared with a similar silicone composition lacking only the hydroxy-functional organic compound. The hot-melt silicone adhesive can be a noncurable adhesive that becomes flowable at an elevated temperature and reverts to a nonflowable state upon cooling. Alternatively, the hot-melt silicone adhesive can be a curable adhesive that undergoes a curing (crosslinking) reaction after the adhesive has been applied to a substrate. Component (A) can be a single hot-melt silicone adhesive or a mixture comprising two or more different hot-melt silicone adhesives.

Hot-melt silicone adhesives suitable for use in the silicone composition of this invention include, but are not limited to, hot-melt silicone pressure sensitive adhesives comprising a silicone fluid and an organopolysiloxane resin; thermoplastic silicone-organic block copolymers; and moisture-curable hot-melt silicone pressure sensitive adhesives. Examples of the aforementioned hot-melt silicone adhesives and methods for their preparation are well known in the art. The U.S. patents cited in the Background section are hereby incorporated by reference to teach hot-melt silicone adhesives suitable for use in the silicone composition of the present invention.

Component (B) of this invention is at least one electrically conductive filler comprising particles having at least an outer surface of a metal selected from silver, gold, platinum, palladium, and alloys thereof. Fillers comprising particles consisting of a metal selected from silver, gold, platinum, palladium, and alloys thereof typically have the form of a powder or flakes with an average particle size of from 0.5 to 20 μm. Fillers comprising particles having only an outer surface of a metal selected from silver, gold, platinum, palladium, and alloys thereof typically have an average particle size of from 15 to 100 μm. The core of the particles can be any electrically conductive or insulative material that supports a surface consisting of the aforementioned metal and does not adversely affect the electrical properties of the silicone composition. Examples of such materials include, but are not limited to, copper, solid glass, hollow glass, mica, nickel, and ceramic fiber.

In the case of electrically conductive fillers comprising metal particles having the form of flakes, the surface of the particles may be coated with a lubricant, such as a fatty acid or fatty acid ester. Such lubricants are typically introduced during the milling process used to produce flakes from a metal powder to prevent the powder from cold welding or forming large aggregates. Even when the flakes are washed with a solvent after milling, some lubricant may remain chemisorbed on the surface of the metal.

The electrically conductive filler of this invention also includes fillers prepared by treating the surfaces of the aforementioned particles with at least one organosilicon compound. Suitable organosilicon compounds include those typically used to treat silica fillers, such as organochlorosilanes, organosiloxane, organodisilazanes, and organoalkoxysilanes.

Component (B) can be a single electrically conductive filler as described above or a mixture of two or more such fillers that differ in at least one of the following properties: composition, surface area, surface treatment, particle size, and particle shape.

Preferably, the electrically conductive filler of the present invention comprises particles consisting of a metal selected from silver, gold, platinum, palladium, and alloys thereof. These solid metal fillers impart thermal conductivity to the composition as well as electrical conductivity. More preferably, the electrically conductive filler comprises particles consisting of silver.

The concentration of component (B) in the silicone composition of this invention is sufficient to impart electrical conductivity to the composition. Typically, the concentration of component (B) is such that the silicone composition has a contact resistance less than about 1Ω and a volume resistivity less than about 0.01 Ω·cm, as determined using the methods in the Examples below. The exact concentration of component (B) depends on the desired electrical properties, surface area of the filler, density of the filler, shape of the filler particles, surface treatment of the filler, and nature of the other components in the silicone composition. The concentration of component (B) is typically from about 15 to about 80 percent by volume and preferably from about 20 to about 50 percent by volume, based on the total volume of the electrically conductive hot-melt silicone adhesive composition. When the concentration of component (B) is less than about 15 percent by volume, the silicone composition typically does not have significant electrical conductivity. When the concentration of component (B) is greater than about 80 percent by volume, the silicone composition typically does not exhibit further substantial improvement in electrical conductivity.

Methods of preparing electrically conductive fillers are well known in the art; many of these fillers are commercially available. For example, powders of silver, gold, platinum, or palladium, or alloys thereof are typically produced by chemical precipitation, electrolytic deposition, or atomization. Also, flakes of the aforementioned metals are typically produced by grinding or milling the metal powder in the presence of a lubricant, such as a fatty acid or fatty acid ester. Particles having only an outer surface of at least one of the aforementioned metals are typically produced by metallizing an appropriate core material using a method such as electrolytic deposition, electroless deposition, or vacuum deposition.

The electrically conductive filler of this invention can be a filler prepared by treating the surfaces of the aforementioned particles with at least one organosilicon compound. In this case, the particles can be treated prior to admixture with the other ingredients of the silicone composition or the particles can be treated in situ during the preparation of the silicone composition.

Component (C) of this invention is at least one hydroxy-functional organic compound having a molecular weight up to about 1000 and containing at least one hydroxy group per molecule, provided that when the composition is curable, the compound does not substantially inhibit cure. When the molecular weight of the hydroxy-functional organic compound is greater than about 1000, the silicone composition does not have substantially improved electrical conductivity relative to a similar silicone composition lacking only the hydroxy-functional organic compound. As used herein, the term "substantially inhibit cure" means to prevent cure or retard cure to the point where the cure rate is impracticably slow, for example, several weeks at room temperature or several days at about 150° C. Preferably, the silicone composition of the present invention cures in less than about 7 days at 25° C.

The structure of the hydroxy-functional organic compound can be linear, branched, or cyclic. The hydroxy group(s) in the hydroxy-functional organic compound may be attached to a primary, secondary or tertiary aliphatic carbon atom; an aromatic carbon atom; or a doubly bonded carbon atom in the molecule. Furthermore, there are no restrictions on the stereochemistry of the hydroxy-bearing carbon atom(s) or the molecule.

The hydroxy-functional organic compound can contain one or more functional groups other than hydroxy, provided that when the organosilicon composition is curable, the compound does not substantially inhibit cure of the composition. Examples of suitable functional groups include, but are not limited to, —O—, >C=O, —CHO, —CO$_2$—,— C≡N, —NO$_2$, >C=C<, —C≡C—, —F, —Cl, —Br, and —I. However, hydroxy-functional organic compounds containing functional groups that strongly complex the metal in a condensation catalyst may substantially inhibit cure of the organosilicon composition. For example, when a tin catalyst is used, hydroxy-functional organic compounds containing thiol (-SH) groups are generally avoided. The degree of inhibition depends on the particular combination of functional group and metal and the mole ratio thereof. The suitability of a particular hydroxy-functional organic compound for use in the silicone composition of the present invention can be readily determined by routine experimentation using the methods in the Examples below.

The hydroxy-functional organic compound can be a naturally occurring or synthetic compound having a liquid or solid state at room temperature. Also, the hydroxy-functional organic compound can be soluble, partially soluble, or insoluble in the silicone composition. The normal boiling point of the hydroxy-functional organic compound, which depends on the molecular weight, structure, and number and nature of functional groups in the compound, can vary over a wide range. Preferably, the hydroxy-functional organic compound has a normal boiling point greater than the temperature at which the silicone composition becomes flowable. Otherwise, appreciable amounts of the hydroxy-functional organic compound may be removed by volatilization during heating, resulting in little or no enhancement in the conductivity of the silicone composition. Also, excessive volatilization of the hydroxy-functional organic compound during heating may cause formation of voids in the silicone composition.

Examples of hydroxy-functional compounds suitable for use in the silicone composition of the present invention include, but are not limited to, monohydric alcohols such as methanol, ethanol, propanol, butanol, pentanol, hexanol, cyclohexanol, hepatanol, nonanol, decanol, undecanol, 1-phenylethanol, benzyl alcohol, allyl alcohol, 3-nitrobenzyl alcohol, 3-chlorobenzyl alcohol, 3-bromobenzyl alcohol, 3-iodobenzyl alcohol, and diethylene glycol butyl ether; dihydric alcohols such as ethylene glycol, propylene glycol (1,2-propanediol), polyethylene glycol, polypropylene glycol, polytetrahydrofuran, benzopinacole, 1,2-butanediol, 1,3-butanediol, 1,4-butanediol, trimethylene glycol (1,3-propanediol), 1,5-pentanediol, 1,6-hexanediol, and bis(2-hydroxyethyl)ether; polyhydric alcohols such as glycerol, pentaerythritol, dipentaerythritiol, tripentaerythritol, trimethylolethane, trimethylolpropane, ditrimethylolpropane, 1,3-dihydroxyacetone dimer, sorbitol, and mannitol; phenols such as phenol, 1-hydroxynaphthalene, 1,2-dihydroxynaphthalene, hydroquinone, catechol, resorcinol, phloroglucinol (1,3,5-trihydroxybenzene), p-cresol, vitamin E, 2-nitrophenol, 2,4-dinitrophenol, picric acid (2,4,6-trinitrophenol), 4-chlorophenol, 2-bromophenol, 2-iodophenol, 2,4,5-tricholorophenol, chlorohydroquinone, pentachlorophenol; sugars such as glucose, mannose, allose, altrose, idose, gulose, galactose, talose, ribose, arabinose, xylose, lyxose, erythrose, threose, glyceraldehyde, fructose, ribulose, lactose, maltose, and sucrose; hydroxy aldehydes such as 2-hydroxybutyraldehyde, 4-hydroxybenzaldehyde, and 2,4-dihydroxybenzaldehyde; hydroxy ketones such as hydroxyacetone, 1-hydroxy-2-butanone, 2',4'-dihydroxyacetophenone, benzoin, and 3-hydroxy-2-butanone; hydroxy acids such as citric acid, gluconic acid, 3-hydroxybutyric acid, 2-hydroxycinnamic acid, and salicylic acid (2-hydroxybenzoic acid); and hydroxy esters such as ascorbic acid, TWEEN 20 (polyoxyethylene (20) sorbitan monolaurate), methyl salicylate, methyl 3-hydroxybenzoate, and methyl 2-hydroxyisobutyrate.

Component (C) is present in an effective amount in the silicone composition of this invention. As used herein, the term "effective amount" means that the concentration of component (C) is such that the silicone composition has improved electrical conductivity, initial contact resistance and/or volume resistivity, compared with a similar silicone composition lacking only the hydroxy-functional organic compound. Typically, the concentration of component (C) is such that the silicone composition exhibits at least about a two-fold improvement in either contact resistance or volume resistivity, as determined using the methods in the Examples below. The concentration of component (C) is typically from about 0.1 to about 3 percent by weight and preferably from about 0.5 to about 1.5 percent by weight, based on the total weight of the silicone composition. When the concentration of component (C) is less than about 0.1 percent by weight, the silicone composition typically does not exhibit improved electrical conductivity. When the concentration of component (C) is greater than about 3 percent by weight, the silicone composition typically does not exhibit further substantial improvement in electrical conductivity. The effective amount of component (C) can be determined by routine experimentation using the methods in the Examples below.

Methods of preparing hydroxy-functional organic compounds suitable for use in the silicone composition of the present invention are well known in the art; many of these compounds are commercially available.

The silicone composition of the present invention can further comprise at least one adhesion promoter. The adhesion promoter can be any adhesion promoter typically employed in uncured and condensation-curable silicone compositions, provided it does not adversely affect the physical properties of the silicone composition, particularly contact resistance and volume resistivity.

Examples of adhesion promoters suitable for use in the silicone composition of the present invention include, but are not limited to, amino-functional alkoxysilanes such as $H_2N(CH_2)_3Si(OCH_3)_3$, $H_2N(CH_2)_3Si(OCH_2CH_3)_3$, $H_2N(CH_2)_3Si(OCH_2CH_2OCH_3)_3$, $H_2N(CH_2)_4Si(OCH_3)_3$, $H_2NCH_2CH(CH_3)CH_2CH_2SiCH_3(OCH_3)_2$, $H_2N(CH_2)_2NH(CH_2)_3 Si(OCH_3)_3$, $H_2N(CH_2)_2NH(CH_2)_3Si(OCH_2CH_2OCH_3)_3$, $CH_3NH(CH_2)_2NH(CH_2)_3Si(OCH_3)_3$, $H_2N(CH_2)_2NH(CH_2)_3Si(CH=CH_2)(OCH_3)_2$; epoxy-functional alkoxysilanes such as 3-glycidoxypropyltrimethoxysilane, 1,2-epoxy-4-(2-trimethoxysilylethyl)cyclohexane, and 1,2-epoxy-2-methyl-4-(1-methyl-2-trimethoxysilylethyl)cyclohexane; reaction products of at least one amino-functional alkoxysilane and at least one epoxy-functional alkoxysilane such as reaction products of 3-glycidoxypropyltrimethoxysilane and 3-aminopropyltrimethoxysilane, 3-glycidoxypropyltrimethoxysilane and [3-(2-aminoethyl) aminopropyl]trimethoxysilane, 1,2-epoxy-4-(2-trimethoxysilylethyl) cyclohexane and 3-aminopropyltrimethoxysilane, 1,2-epoxy-4-(2-trimethoxysilylethyl) cyclohexane and [3-(2-aminoethyl) aminopropyl]trimethoxysilane, 1,2-epoxy-2-methyl-4-(1-methyl-2-trimethoxysilylethyl)cyclohexane and 3-aminopropyltrimethoxysilane, and 1,2-epoxy-2-methyl-4-(1-methyl-2-trimethoxysilylethyl)cyclohexane and [3-(2-aminoethyl)aminopropyl]trimethoxysilane; and vinyl trialkoxysilanes such as $(CH_3O)_3SiCH=CH_2$, $(CH_3CH_2O)_3SiCH=CH_2$, $(CH_3 CH_2CH_2O)_3SiCH=CH_2$, $(CH_3CH_2 CH_2CH_2O)_3SiCH=CH_2$, and $(CH_3OCH_2CH_2O)_3SiCH=CH_2$.

The concentration of the adhesion promoter in the silicone composition of this invention is sufficient to effect adhesion of the composition to a substrate, such as those cited above. The concentration can vary over a wide range depending on the nature of the adhesion promoter, the type of substrate, and the desired adhesive bond strength. The concentration of the adhesion promoter is generally from 0.01 to about 10 percent by weight, based on the total weight composition. However, the optimum concentration of the adhesion promoter can be readily determined by routine experimentation.

Methods of preparing amino-functional alkoxysilanes are well known in the art as exemplified in U.S. Pat. No. 3,888,815 to Bessmer et al. Methods of preparing epoxy-functional alkoxysilanes, such as the hydrosilylation addition reaction of alkenyl-containing epoxysilanes with trialkoxysilanes, and methods of preparing vinyl trialkoxysilanes, such as the reaction of vinyltrichlorosilane with alcohols, are also well known in the art. Reaction products of amino-functional alkoxysilanes and epoxy-functional alkoxysilanes can be prepared using well known methods of reacting epoxy-containing compounds with amines. The reaction is typically carried out using about a 1:1 mole ratio of epoxy groups in the epoxy-functional alkoxysilane to nitrogen-bonded hydrogen atoms in the amino-functional alkoxysilane. The two compounds can be reacted either in the presence of an inert organic solvent, such as toluene, or in the absence of a diluent. The reaction can be carried out at room temperature or an elevated temperature, for example, from about 50 to about 100° C.

The silicone composition of the instant invention is typically prepared by mixing components (A) through (C) and any optional ingredients in the stated proportions at ambient temperature with or without the aid of an organic solvent. Mixing can be accomplished by any of the techniques known in the art such as milling, blending, and stirring, either in a batch or continuous process. Examples of suitable organic solvents include hydrocarbons, such as xylene, toluene, and heptane. The organic solvent can be removed to provide an essentially solvent-free silicone composition by heating the mixture under reduced pressure.

The silicone composition can be applied to a wide variety of solid substrates including, but not limited to, metals such as aluminum, gold, silver, tin-lead, nickel, copper, and iron, and their alloys; silicon; fluorocarbon polymers such as polytetrafluoroethylene and polyvinylfluoride; polyamides such as Nylon; polyimides; polyesters; ceramics; and glass. Typically, the silicone composition is heated to a temperature sufficient to induce flow, for example, from about 50 to about 200° C., before application to a substrate. However, the silicone composition can also be applied to a substrate in an organic solvent. The silicone composition can be applied to various substrates using equipment conventionally employed for dispensing organic hot-melt adhesives, such as hot-melt guns, sprayers, extruders, heated draw-down bars, doctor blades, and calandar rolls.

The silicone composition has numerous advantages, including good flow, low VOC (volatile organic compound) content, good adhesion, and unexpectedly superior electrical properties.

With regard to flow, the silicone composition becomes flowable at an elevated temperature and reverts to a non-flowable state upon cooling. The flowable liquid possess the rheological properties required for a number of applications and is easily dispensed and applied using standard equipment.

Furthermore, the silicone composition has a very low VOC (volatile organic compound) content. Consequently, the silicone composition avoids the health, safety, and environmental hazards associated with solvent-borne silicone compositions. In addition, the solventless composition of the present invention typically undergoes less shrinkage during curing than solvent-borne silicone compositions.

Further, the silicone composition exhibits good adhesion to a wide variety of materials, including metals, glass, silicon, silicon dioxide, ceramics, polyesters, and polyimides.

Importantly, the silicone composition has unexpectedly improved electrical conductivity, as evidenced by a low initial contact resistance and/or volume resistivity, compared with a similar silicone composition lacking only the hydroxy-functional organic compound.

The silicone composition has numerous uses, including die attach adhesives, solder replacements, and electrically conductive coatings and gaskets. In particular, the silicone composition is useful for bonding electronic components to flexible or rigid substrates. The composition of the present invention is also useful as a thermal interface material in semiconductor packages. For example, the silicone composition can be used as the thermal interface between heat-generating semiconductor elements, such as power transistors and integrated circuits, and substrates, lead frames, and heat-dissipating fins.

EXAMPLES

The following examples are presented to further illustrate the silicone composition of this invention, but are not to be considered as limiting the invention, which is delineated in the appended claims. Unless otherwise noted, all parts and percentages reported in the examples are by weight. The following methods and materials were employed in the examples:

The initial contact resistance of a silicone composition on copper was determined using a Keithley Instruments Model 580 Micro-ohm Meter equipped with a 4-pole probe having spring-loaded, gold-plated, chisel point tips. The reported value for contact resistance, expressed in units of ohms, represents the average of three measurements, each performed on a different contact resistance joint. Contact resistance joints were prepared by bonding two rectangular copper bars (0.254 cm×0.254 cm×2.032 cm) with the silicone composition to form a cross-shaped (+) fixture, according to one of the methods described below. Prior to bonding, one rectangular face, the bond face, of each copper bar was sanded with 400 grit silicon carbide waterproof sandpaper, scrubbed with a Kimwipe dampened with heptane followed by a Kimwipe dampened with isopropanol, and air-dried at room temperature for at least 1 h.

Contact resistance joints in Comparative Examples 1–6, Comparative Example 10, Examples 1–6, Example 12, and Example 13 were prepared as follows: A small aliquot of the silicone composition was applied at approximately the center (lengthwise) of a first bar. The first bar was heated in an oven at either 120° C. for 15 min (Comparative Examples 1–6 and Examples 1–6) or 150° C. for 10 min (Comparative Example 10, Example 12, and Example 13) and then removed from the oven. While the first bar was still warm, a second bar was then oriented perpendicular to the first bar with the center (lengthwise) of each bar facing the other and the silicone composition forming a bondline of 0.025 cm. Finally, the cross-shaped fixture was heated in a forced air oven at 150° C. for 1 h and then allowed to cool to room temperature.

Contact resistance joints in Comparative Example 7 and Example 7 were prepared as follows: A small aliquot of the hot, flowable silicone composition was applied at approximately the center (lengthwise) of a first bar. A second bar was then oriented perpendicular to the first bar with the center (lengthwise) of each bar facing the other and the silicone composition forming a bondline of 0.025 cm. Finally, the cross-shaped fixture was cured in a forced air oven at either 150° C. for 1 h and then allowed to cool to room temperature.

Contact resistance joints in Comparative Example 8, Example 8, and Example 9 were prepared as follows: A small aliquot of the silicone composition was applied at approximately the center (lengthwise) of a first bar. A second bar was then oriented perpendicular to the first bar with the center (lengthwise) of each bar facing the other and the silicone composition forming a bondline of 0.025 cm. Finally, the cross-shaped fixture was heated in a forced air oven at 120° C. for 1 h and then allowed to cool to room temperature.

Contact resistance joints in Comparative Example 9, Example 10, and Example 11 were prepared as follows: The silicone composition and a first bar were heated individually in an oven at 100° C. for 15 min. After removing the silicone composition and the first bar from the oven, a small aliquot of the flowable silicone composition was applied at approximately the center (lengthwise) of the first bar. A second bar was then oriented perpendicular to the first bar with the center (lengthwise) of each bar facing the other and the silicone composition forming a bondline of 0.025 cm. Finally, the cross-shaped fixture was heated in a forced air oven at 150° C. for 1 h and then allowed to cool to room temperature.

Volume resistivity of a silicone composition was determined using a Keithley Instruments Model 580 Micro-ohm Meter equipped with a four-point probe having spring-loaded, gold-plated, spherical tips. Test specimens in Comparative Examples 1–8 and Examples 1–9 were prepared as follows: Two strips of 3M Scotch brand tape were placed 0.25 cm apart on a glass microscope slide to form a channel extending the length of the slide. An aliquot of the silicone composition was deposited at one end of the slide and over the channel. The silicone composition was used at room temperature, except in Comparative Example 7 and Example 7, where the composition was used in a hot, flowable state. The silicone composition was then spread over the entire channel by drawing a razor blade through the composition and across the surface at an angle of about 45°. The tape strips were removed and the specimen was heated in a forced air oven at 150° C. for 1 h, except for the specimens of Comparative Example 8, Example 8, and Example 9, which were heated at 120° C. for 1 h. After allowing the specimen to cool to room temperature, the voltage drop between the two inner probe tips was measured at an appropriate current to give a resistance value in ohms. The initial volume resistivity of the silicone adhesive composition was then calculated using the following equation:

$$V = R(W \times T/L)$$

where V is volume resistivity in ohm-centimeters, R is resistance (ohms) of the silicone adhesive composition measured between two inner probe tips spaced 2.54 cm apart, W is the width of the adhesive layer in centimeters, T is the thickness of the adhesive layer in centimeters, and L is the length of the adhesive layer between the inner probes in centimeters (2.54 cm). The thickness of the adhesive layer, typically about 0.004 cm, was determined using an Ames Model LG3500-0-04 thickness gauge. The reported values for volume resistivity, expressed in units of ohm-centimeters, represent the average of three measurements, each performed on identically prepared test specimens.

Volume resistivity was not measured in Comparative Example 9, Comparative Example 10, and Examples 10–13 because suitable test specimens could not be prepared using the hot silicone compositions.

Resin: a solution consisting of 64.4% of an organopolysiloxane resin in xylenes, wherein the resin consists essentially of $(CH_3)_3SiO_{1/2}$ siloxane units and $SiO_{4/2}$ siloxane units, the resin has a number-average molecular weight of about 4,600, the mole ratio of $(CH_3)_3SiO_{1/2}$ units to $SiO_{4/2}$ units is about 0.70:1, and the resin contains less than 1% by weight of silicon-bonded hydroxy groups.

Silicone Base: a mixture consisting of 65.48% of Resin and 34.52 of a trimethylsiloxy-terminated polydimethylsiloxane having a viscosity of about 1,000 mm²/s at 25 C.

Polymer A: an trimethoxysilylethyl-terminated polydimethylsiloxane having a viscosity of about 65,000 mm²/s at 25 C.

Polymer B: a caprolactone-octamethylcyclotetrasiloxane triblock copolymer [CAS. No. 120359-07-1] having a melting point of 52–56° C., molecular weight of 5,700–6,900, and specific gravity of 1.05. The copolymer is commercially available from Gelest, Incorporated (product code: DBL-C31).

Curing Agent: vinyltrimethoxysilane

Catalyst: tetrabutyltitanate, $Ti[O(CH_2)_3CH_3]_4$

Filler A: a silver powder sold under the name SF-22 by Degussa Corporation. The filler has a tap density of 3.5 g/cm³; surface area of 1.07 m²/g; weight loss of 0.05% at 110° C.; weight loss of 0.45% at 538° C.; and a particle size distribution of 9.7 μm (95%), 7.5 μm (90%), 3.0 μm (50%), and 1.0 μm (10%).

Filler B: a silver powder sold under the name SPEG by Degussa Corporation. The filler has a tap density of 2.2 g/cm³; surface area of 0.25 m²/g; weight loss of 0.00% at 110° C.; weight loss of 0.05% at 538° C.; and a particle size distribution of −325 mesh (96.1%), +325 mesh (3.4%), and +270 mesh (0.5%).

Filler C: a 200-mesh copper powder having density of 8.920 and F.W. 64.54. The copper powder is commercially available from Aldrich Chemical Company (cat. no. 20,778-0).

Comparative Example 1

Silicone Base (30.33 parts) and 69.67 parts of Filler A were blended for 26 s using an AM 501 Hauschild dental mixer. The mixture was allowed to cool to room temperature and blended for an additional 26 s. The contact resistance and volume resistivity of the silicone composition are shown in Table 1.

Comparative Example 2

Silicone Base (26.86 parts) and 73.14 parts of Filler A were combined using the method of Comparative Example 1. The contact resistance and volume resistivity of the silicone composition are shown in Table 1.

Comparative Example 3

Silicone Base (23.41 parts) and 76.59 parts of Filler A were combined using the method of Comparative Example 1. The contact resistance and volume resistivity of the silicone composition are shown in Table 1.

Comparative Example 4

The silicone composition of Comparative Example 3 was blended for 16 s using an AM 501 Hauschild dental mixer. The contact resistance and volume resistivity of the resulting silicone composition are shown in Table 1.

Example 1

The silicone composition of Comparative Example 4 (99.13 parts) and 0.87 part of ethylene glycol were blended for 26 s using an AM 501 Hauschild dental mixer. The contact resistance and volume resistivity of the resulting silicone composition are shown in Table 1.

Example 2

The silicone composition of Comparative Example 4 (99.16 parts) and 0.84 part of 1,3-dihydroxyacetone dimer were blended for 26 s using an AM 501 Hauschild dental mixer. The contact resistance and volume resistivity of the resulting silicone adhesive are shown in Table 1.

Comparative Example 5

Silicone Base (23.42 parts) and 76.58 parts of Filler B were blended for 52 s using an AM 501 Hauschild dental mixer. The contact resistance and volume resistivity of the silicone composition are shown in Table 1.

Example 3

The silicone composition of Comparative Example 5 (99.09 parts) and 0.91 part of ethylene glycol were blended for 52 s using an AM 501 Hauschild dental mixer. The contact resistance and volume resistivity of the resulting silicone composition are shown in Table 1.

Example 4

The silicone composition of Comparative Example 5 (99.18 parts) and 0.82 part of 1,3-dihydroxyacetone dimer were blended for 52 s using an AM 501 Hauschild dental mixer. The contact resistance and volume resistivity of the resulting silicone composition are shown in Table 1.

Comparative Example 6

Silicone Base (18.85 parts) and 81.15 parts of Filler C were blended for 52 s using an AM 501 Hauschild dental mixer. The contact resistance and volume resistivity of the silicone composition are shown in Table 1.

Example 5

The silicone composition of Comparative Example 6 (99.20 parts) and 0.80 part of ethylene glycol were blended for 52 s using an AM 501 Hauschild dental mixer. The contact resistance and volume resistivity of the resulting silicone composition are shown in Table 1.

Example 6

The silicone composition of Comparative Example 6 (99.22 parts) and 0.78 part of 1,3-dihydroxyacetone dimer were blended for 52 s using an AM 501 Hauschild dental mixer. The contact resistance and volume resistivity of the resulting silicone composition are shown in Table 1.

Comparative Example 7

Silicone Base (23.39 parts) was heated in an oven at 150° C. for 20 min to eliminate solvent and then removed from the oven. The heat-treated Silicone Base and 76.61 parts of Filler A were immediately blended to homogeneity using a spatula. The resulting mixture was heated in an oven at 150° C. for 10 min, removed from the oven, and blended for 52 s using an AM 501 Hauschild dental mixer. The hot, flowable composition was used to assemble specimens for contact resistance and volume resistivity measurements. The contact resistance and volume resistivity of the silicone composition are shown in Table 1.

Example 7

The silicone composition of Comparative Example 7 was heated to a liquid state. The hot composition (99.91 parts) and 1.09 parts of ethylene glycol were immediately blended to homogeneity using a spatula. The resulting mixture was heated in an oven at 150° C. for 10 min, removed from the oven, and blended for 26 s using an AM 501 Hauschild dental mixer. The hot, flowable composition was used to assemble specimens for contact resistance and volume resistivity measurements. The contact resistance and volume resistivity of the resulting silicone composition are shown in Table 1.

Comparative Example 8

Resin (64.99 parts) and 34.24 parts of Polymer A were blended to homogeneity using a spatula. Curing Agent (0.38 part) was added to the mixture and the components were blended to homogeneity using a spatula. Catalyst (0.40 part) was added to the mixture and the components were again blended to homogeneity using a spatula. The resulting mixture (23.40 parts) and 76.60 parts of Filler A were blended for 52 s using an AM 501 Hauschild dental mixer. The contact resistance and volume resistivity of the silicone composition are shown in Table 1.

Example 8

The silicone composition of Comparative Example 8 (99.20 parts) and 0.80 part of ethylene glycol were blended for 52 s using an AM 501 Hauschild dental mixer. The contact resistance and volume resistivity of the resulting silicone composition are shown in Table 1.

Example 9

The silicone composition of Comparative Example 8 (99.24 parts) and 0.76 part of 1,3-dihydroxyacetone dimer were blended for 52 s using an AM 501 Hauschild dental mixer. The contact resistance and volume resistivity of the resulting silicone composition are shown in Table 1.

Comparative Example 9

Polymer B was heated in an oven at 100° C. to a liquid state and then removed from the oven. Hot Polymer B (18.94 parts) and 81.06 parts of Filler A were immediately blended for 26 s using an AM 501 Hauschild dental mixer. The resulting mixture was heated in an oven at 100° C. for 10 min, removed from the oven, and blended for 52 s to produce a dry, coarse granular substance. The contact resistance of the silicone composition is shown in Table 1.

Example 10

The silicone composition of Comparative Example 9 (98.84 parts) and 1.16 parts of ethylene glycol were blended for 52 s using an AM 501 Hauschild dental mixer. The contact resistance of the resulting silicone composition is shown in Table 1.

Example 11

The silicone composition of Comparative Example 9 (98.91 parts) and 1.09 parts of 1,3-dihydroxyacetone dimer were blended for 52 s using an AM 501 Hauschild dental mixer. The contact resistance of the resulting silicone composition is shown in Table 1.

Comparative Example 10

The silicone composition of Comparative Example 9 (94.24 parts) and 5.76 parts of xylenes were blended for 26 s using an AM 501 Hauschild dental mixer. The contact resistance of the silicone composition is shown in Table 1.

Example 12

The silicone composition of Comparative Example 10 (98.84 parts) and 1.16 parts of ethylene glycol were blended for 52 s using an AM 501 Hauschild dental mixer. The contact resistance of the resulting silicone composition is shown in Table 1.

Example 13

The silicone composition of Comparative Example 10 (98.91 parts) and 1.09 parts of 1,3-dihydroxyacetone dimer were blended for 52 s using an AM 501 Hauschild dental mixer. The contact resistance of the resulting silicone composition is shown in Table 1.

TABLE 1

| Example | Hydroxy-Functional Organic Compound | Contact Resistance ($\Omega$) | Volume Resistivity ($\Omega \cdot$ cm) |
|---|---|---|---|
| C1 | — | — | $7.46 \times 10^{-4}$ |
| C2 | — | $4.85 \times 10^{2}$ | $5.29 \times 10^{-3}$ |
| C3 | — | $3.90 \times 10^{-1}$ | $4.48 \times 10^{-3}$ |
| C4 | — | $1.46 \times 10^{-1}$ | $7.06 \times 10^{-5}$ |
| 1 | ethylene glycol | $5.16 \times 10^{-3}$ | $6.87 \times 10^{-5}$ |
| 2 | 1,3-dihydroxyacetone dimer | $4.12 \times 10^{-3}$ | $7.37 \times 10^{-5}$ |
| C5 | — | $1.40 \times 10^{-1}$ | $1.11 \times 10^{-3}$ |
| 3 | ethylene glycol | $2.28 \times 10^{-2}$ | $8.68 \times 10^{-4}$ |
| 4 | 1,3-dihydroxyacetone dimer | $1.01 \times 10^{-2}$ | $1.01 \times 10^{-3}$ |
| C6 | — | $7.43 \times 10^{4}$ | — |
| 5 | ethyleneglycol | 5.54 | — |
| 6 | 1,3-dihydroxyacetone dimer | $2.40 \times 10^{2}$ | — |
| C7 | — | $1.08 \times 10^{-1}$ | $7.83 \times 10^{-4}$ |
| 7 | ethylene glycol | $2.60 \times 10^{-4}$ | $8.27 \times 10^{-5}$ |
| C8 | — | $8.77 \times 10^{-2}$ | $4.96 \times 10^{-3}$ |
| 8 | ethyleneglycol | $1.59 \times 10^{-2}$ | $6.58 \times 10^{-4}$ |
| 9 | 1,3-dihydroxyacetone dimer | $3.21 \times 10^{-1}$ | $2.27 \times 10^{1}$ |
| C9 | — | $9.42 \times 10^{-3}$ | not measured |
| 10 | ethylene glycol | $1.18 \times 10^{-3}$ | " |
| 11 | 1,3-dihydroxyacetone dimer | $8.87 \times 10^{-4}$ | " |
| C10 | — | $4.59 \times 10^{-3}$ | " |
| 12 | ethylene glycol | $5.60 \times 10^{-4}$ | " |
| 13 | 1,3-dihydroxyacetone dimer | $3.08 \times 10^{-3}$ | " |

— Denotes an unmeasurable value exceeding $2 \times 10^{5}$ $\Omega$ or $5 \times 10^{1}$ $\Omega \cdot$ cm.

That which is claimed is:

1. An electrically conductive hot-melt silicone adhesive composition, comprising:
   (A) a hot-melt silicone adhesive;
   (B) an electrically conductive filler in an amount sufficient to impart electrical conductivity to the composition, wherein the filler comprises particles having at least an outer surface of a metal selected from silver, gold, platinum, palladium, and alloys thereof; and
   (C) an effective amount of a hydroxy-functional organic compound having a molecular weight up to about 1000 and containing at least one hydroxy group per molecule, provided that when the composition is curable, the compound does not substantially inhibit cure.

2. The composition according to claim 1, wherein the hot-melt silicone adhesive is selected from a hot-melt silicone pressure sensitive adhesive comprising a silicone fluid and an organopolysiloxane resin, a thermoplastic silicone-organic block copolymer, and a moisture-curable hot-melt silicone pressure sensitive adhesive.

3. The composition according to claim 1, wherein the filler comprises particles consisting of a metal selected from silver, gold, platinum, palladium, or alloys thereof.

4. The composition according to claim 3, wherein the particles consist of silver.

5. The composition according to claim 1, wherein the filler has a concentration from about 20 to about 50 percent by volume, based on the total volume of the composition.

6. The composition according to claim 2, wherein the composition becomes flowable at a temperature of from about 50 to about 200° C.

7. The composition according to claim 6, wherein the hydroxy-functional organic compound has a normal boiling point greater than the temperature at which the composition becomes flowable.

8. The composition according to claim 1, wherein the hydroxy-functional organic compound is selected from at least one monohydric alcohol, at least one dihydric alcohol, at least one polyhydric alcohol, at least one phenol, at least one sugar, at least one hydroxy aldehyde, at least one hydroxy ketone, at least one hydroxy acid, at least one hydroxy ester, and a mixture comprising at least two of the aforementioned compounds.

9. The composition according to claim 8, wherein the hydroxy-functional organic compound is selected from at least one monohydric alcohol, at least one dihydric alcohol, at least one polyhydric alcohol, and a mixture comprising at least two of the aforementioned compounds.

10. The composition according to claim 1, wherein the concentration of the hydroxy-functional organic compound is from 0.5 to 1.5 percent by weight, based on the total weight of the composition.

11. The composition according to claim 1, wherein the composition further comprises an adhesion promoter.

12. The composition according to claim 11, wherein the adhesion promoter is selected from at least one amino-functional alkoxysilane, at least one epoxy-functional alkoxysilane, at least one halo-functional alkoxysilane, and a reaction product of at least one amino-functional alkoxysilane and at least one epoxy-functional alkoxysilane.

13. A composition comprising:
   (A) a hot-melt silicone adhesive,
   (B) an electrically conductive filler in an amount sufficient to impart electrical conductivity to the composition, and
   (C) an effective amount of a hydroxy-functional organic compound having a molecular weight up to 1000 and containing at least one hydroxyl group per molecule, provided that the compound does not substantially inhibit cure of the composition; whereby the effective amount of component (C) imparts improved initial contact resistance and/or volume resistivity to the composition as compared with a similar silicone composition lacking component (C).

14. The composition of claim 13, wherein component (A) comprises a combination of an organopolysiloxane resin and a silicone fluid.

15. The composition of claim 14, wherein the organopolysiloxane resin comprises $(CH_3)_3SiO_{1/2}$ siloxane units and $SiO_{4/2}$ siloxane units, wherein a mole ratio of the $(CH_3)_3SiO_{1/2}$ siloxane units to the $SiO_{4/2}$ siloxane units is about 0.70:1.

16. The composition of claim 14, wherein the silicone fluid comprises trimethylsiloxy-terminated polydimethylsiloxane.

17. The composition of claim 13, wherein component (A) comprises a thermoplastic silicone-organic block copolymer or a moisture curable hot-melt silicone pressure sensitive adhesive.

18. The composition of claim 17, wherein the silicone-organic block copolymer comprises caprolactone-octamethylcyclotetrasiloxane triblock copolymer.

19. The composition of claim 17, wherein the moisture curable hot-melt silicone pressure sensitive adhesive comprises trimethoxysilylethyl-terminated polydimethylsiloxane.

20. The composition of claim 13, wherein component (A) further comprises a curing agent and a catalyst.

21. The composition of claim 20, wherein the curing agent comprises vinyltrimethoxysilane and the catalyst comprises tetrabutyl titanate.

22. The composition of claim 13, wherein component (C) comprises ethylene glycol or 1,3-dihydroxyacetone dimer.

* * * * *